United States Patent
Yu et al.

(10) Patent No.: US 10,400,379 B2
(45) Date of Patent: Sep. 3, 2019

(54) LAUNDRY PROCESSING APPARATUS

(71) Applicant: LG ELECTRONICS INC., Seoul (KR)

(72) Inventors: Insik Yu, Seoul (KR); Youngjong Kim, Seoul (KR); Youngjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/558,770

(22) PCT Filed: Mar. 15, 2016

(86) PCT No.: PCT/KR2016/002558
§ 371 (c)(1),
(2) Date: Sep. 15, 2017

(87) PCT Pub. No.: WO2016/148480
PCT Pub. Date: Sep. 22, 2016

(65) Prior Publication Data
US 2018/0073181 A1    Mar. 15, 2018

(30) Foreign Application Priority Data
Mar. 16, 2015  (KR) .................. 10-2015-0036041

(51) Int. Cl.
*D06F 37/20*     (2006.01)
*D06F 37/24*     (2006.01)
(Continued)

(52) U.S. Cl.
CPC .............. *D06F 37/24* (2013.01); *D06F 37/20* (2013.01); *D06F 37/40* (2013.01); *D06F 39/005* (2013.01);
(Continued)

(58) Field of Classification Search
CPC .......... D06F 37/24; D06F 37/20; D06F 37/22; D06F 37/225; D06F 37/268
See application file for complete search history.

(56) References Cited

U.S. PATENT DOCUMENTS 2,968,970 A * 1/1961 Lepper ................. D06F 37/225
                                            210/363
3,389,881 A * 6/1968 Stelwagen .............. D06F 37/22
                                            210/364
(Continued)

FOREIGN PATENT DOCUMENTS

JP            01064692    *  3/2010
KR    20-1992-0006395 U      4/1992
(Continued)

*Primary Examiner* — Kimberley S Wright
(74) *Attorney, Agent, or Firm* — Dentons US LLP

(57) ABSTRACT

A laundry processing apparatus according to the present invention comprises: a cabinet; a tub, arranged in the interior of the cabinet, for storing laundry water; longitudinal dampers connecting the cabinet and tub and supported on supporting ends on the hub, and supporting the tub as same hangs from the cabinet; pivot supporting parts arranged on the top parts of the cabinet and from which the longitudinal dampers are hung and supported; upper guide pins fixed to the pivot supporting parts and extending vertically; upper transverse dampers, connecting the upper guide pins and tub and vertically movable along the upper guide pins, for reducing the horizontal vibration for the tub. The laundry processing apparatus according to the present invention has the effect of reducing the horizontal vibration of the tub by means of the transverse dampers connecting the pivot supporting parts and tub.

15 Claims, 8 Drawing Sheets

(51) Int. Cl.
*D06F 37/40* (2006.01)
*D06F 39/00* (2006.01)
*D06F 39/14* (2006.01)
*F16F 1/36* (2006.01)
*F16F 9/19* (2006.01)
*F16F 9/54* (2006.01)
*D06F 37/26* (2006.01)

(52) U.S. Cl.
CPC ............ *D06F 39/14* (2013.01); *D06F 37/268* (2013.01); *F16F 1/36* (2013.01); *F16F 9/19* (2013.01); *F16F 9/54* (2013.01); *F16F 2230/0052* (2013.01)

(56) References Cited

U.S. PATENT DOCUMENTS

| | | | | |
|---|---|---|---|---|
| 3,744,746 A * | 7/1973 | Weir | .................. | D06F 37/24 210/364 |
| 4,792,127 A * | 12/1988 | Kortgen | .................. | F16F 7/09 267/64.15 |
| 5,117,659 A * | 6/1992 | Sharp | .................. | D06F 37/24 248/568 |
| 5,490,400 A * | 2/1996 | Kim | .................. | D06F 39/12 68/23.3 |
| 5,520,029 A * | 5/1996 | Savkar | .................. | D06F 37/24 248/610 |
| 5,528,913 A * | 6/1996 | Savkar | .................. | D06F 37/20 248/610 |
| 5,606,879 A * | 3/1997 | Froelicher | .................. | D06F 37/20 188/129 |
| 5,613,380 A * | 3/1997 | Savkar | .................. | D06F 37/20 248/610 |
| 5,884,891 A * | 3/1999 | Hawkins | .................. | D06F 37/24 248/288.31 |
| 5,887,455 A * | 3/1999 | Kim | .................. | D06F 37/20 248/613 |
| 5,946,947 A * | 9/1999 | Lee | .................. | D06F 37/24 68/23.1 |
| 6,122,942 A * | 9/2000 | Jung | .................. | D06F 37/24 68/23.3 |
| 6,397,643 B1 * | 6/2002 | Chang | .................. | D06F 37/24 68/23.1 |
| 7,341,132 B2 * | 3/2008 | Peuker | .................. | D06F 37/20 188/322.17 |
| 7,971,693 B2 * | 7/2011 | Peuker | .................. | D06F 37/20 188/381 |
| 9,365,966 B2 * | 6/2016 | Kim | .................. | D06F 37/268 |
| 9,476,154 B2 * | 10/2016 | Mantri | .................. | D06F 37/245 |
| 9,790,632 B2 * | 10/2017 | Yu | .................. | D06F 37/24 |
| 9,797,081 B2 * | 10/2017 | Miller | .................. | D06F 37/268 |
| 9,890,491 B2 * | 2/2018 | Yu | .................. | D06F 37/265 |
| 9,896,793 B2 * | 2/2018 | Yu | .................. | D06F 37/24 |
| 9,915,018 B2 * | 3/2018 | Kim | .................. | D06F 37/12 |
| 2004/0226321 A1 * | 11/2004 | Park | .................. | D06F 37/20 68/23.1 |
| 2007/0039792 A1 * | 2/2007 | Peuker | .................. | D06F 37/20 188/322.16 |
| 2008/0256986 A1 * | 10/2008 | Ackermann | .................. | D06F 37/20 68/23.1 |
| 2009/0031760 A1 * | 2/2009 | Kim | .................. | D06F 37/20 68/23.1 |
| 2009/0031761 A1 * | 2/2009 | Kim | .................. | D06F 37/20 68/23.1 |
| 2011/0167878 A1 * | 7/2011 | De Angelo Sanchez | .................. | D06F 37/24 68/212 |
| 2011/0247372 A1 * | 10/2011 | Miller | .................. | D06F 37/12 68/13 R |
| 2011/0277514 A1 * | 11/2011 | Kim | .................. | D06F 37/12 68/23.2 |
| 2012/0056517 A1 * | 3/2012 | Noh | .................. | D06F 37/24 312/228 |
| 2012/0060300 A1 * | 3/2012 | Kim | .................. | D06F 23/04 8/137 |
| 2014/0060120 A1 * | 3/2014 | Yu | .................. | D06F 37/24 68/132 |
| 2014/0367536 A1 * | 12/2014 | Wong | .................. | D06F 37/22 248/176.1 |
| 2015/0020548 A1 * | 1/2015 | Yu | .................. | D06F 37/24 68/23.2 |
| 2015/0020551 A1 * | 1/2015 | Yu | .................. | D06F 37/265 68/23.3 |
| 2015/0020552 A1 * | 1/2015 | Yu | .................. | D06F 37/265 68/23.3 |
| 2015/0123522 A1 * | 5/2015 | Park | .................. | D06F 37/268 312/228 |
| 2015/0184329 A1 * | 7/2015 | Kim | .................. | D06F 37/268 312/228 |
| 2016/0024705 A1 * | 1/2016 | Hernden | .................. | D06F 37/24 267/140.13 |

FOREIGN PATENT DOCUMENTS

| | | |
|---|---|---|
| KR | 20-1995-0023334 U | 8/1995 |
| KR | 20-1996-0017666 U | 6/1996 |
| KR | 10-0195454 B1 | 6/1999 |
| KR | 10-2015-0011215 A | 1/2015 |

\* cited by examiner

LAUNDRY PROCESSING APPARATUS

This application is a National Stage Application of International Application No. PCT/KR2016/002558, filed on Mar. 15, 2016, which claims the benefit of Korean Patent Application No. 10-2015-0036041, filed on Mar. 16, 2015, all of which are hereby incorporated by reference in their entirety for all purposes as if fully set forth herein.

TECHNICAL FIELD

The present invention relates to a laundry processing apparatus for reducing the horizontal vibration of a tub.

BACKGROUND ART

In general, a laundry processing apparatus is an apparatus for processing laundry by applying physical and chemical activities to the laundry. A washing machine for removing contaminants included in laundry, a dehydrator for dehydrating the laundry by rotating a washing tub including the laundry at high speed, and a dryer for drying wet laundry by applying cool wind or hot wind into a washing tube is referred as a laundry processing apparatus.

The laundry processing apparatus includes a tub received as same hangs inside a cabinet by a vertical suspension and a drum rotated in the tub to receive laundry (or clothes). The washing machine further includes a pulsator (laundry wing) rotated in the drum.

Since the laundry processing apparatus rotates a drum or a pulsator, vibration occurs. A general laundry processing apparatus includes a device for buffering vibration of the tub.

The vertical suspension according to the related art performs a function for reducing the vertical vibration of the tub.

However, the vertical suspension can buffer only the vertical vibration occurring from the tub but cannot efficiently reduce the horizontal vibration.

In particular, in recent years, in order to improve utility of a residential space, researches and studies have been actively carried out to maximize capability of the tube while maintaining the whole size of the laundry processing apparatus. Accordingly, a gap between the cabinet and the tub is gradually reduced.

However, since collision possibility between the tub and the cabinet is increased when the gap between the cabinet and the tub is reduced, the horizontal vibration of the tub should be efficiently reduced.

DISCLOSURE

Technical Problem

An embodiment of the present invention provides a laundry processing apparatus for efficiently reducing the horizontal vibration of a tub.

Technical Solution

There is provided a laundry processing apparatus including: a cabinet; a tub, arranged in the interior of the cabinet, for storing laundry water; longitudinal dampers connecting the cabinet and tub and supported on supporting ends on the hub, and supporting the tub as same hangs from the cabinet; pivot supporting parts arranged on the top parts of the cabinet and from which the longitudinal dampers are hung and supported; upper guide pins fixed to the pivot supporting parts and extending vertically; and upper transverse dampers, connecting the upper guide pins and tub and vertically movable along the upper guide pins, for reducing the horizontal vibration for the tub.

The cabinet may further include a top cover disposed at an upper part of the tub, and the pivot supporting part may be fixed to the top cover.

A plurality of the upper transverse dampers may be disposed at a center of a vertical axis of the tub at a same interval.

At least a part of the upper guide pin may be inclined at a vertical direction.

The upper guide pin may include: an oblique support part fixed to the pivot supporting part and inclined at a vertical direction; and a guide part coupled with the upper transverse damper to vertically guide the upper transverse damper.

The laundry processing apparatus may further include: a lower guide pin fixed to a lower part of the cabinet and vertically extending long; and a lower transverse damper, connecting the lower guide pin and the tub, vertically moving along the lower guide pin, for reducing the horizontal vibration for the tub.

A plurality of the lower transverse dampers may be disposed at a center of a vertical axis of the tub at a same interval.

An outer side of at least one of the upper transverse damper or the lower transverse damper may be located at an edge of the cabinet.

At least one of the upper guide pin or the lower guide pin may be inclined based on a center of a vertical axis of the tub.

The upper guide pin may include: an oblique support part fixed to the pivot support part and inclined based on a center of a vertical axis of the tub; and a guide part coupled with the upper transvers damper to vertically guide the upper transverse damper.

The cabinet may include: a cabinet base placed on a ground; a cabinet body coupled with an edge of the cabinet case to form a lateral surface; and a top cover coupled with an upper part of the cabinet body and including an upper part formed therein with an introduction hole so that laundry is vertically introduced, wherein the upper guide pin may be installed at the top cover, and the lower guide pin may be installed at the cabinet base.

At least one of the upper guide pin or the lower guide pin may be inclined based on a center of a vertical axis of the tub.

At least a part of the upper guide pin may be inclined based on a center of a vertical axis of the tub, and at least a part of the lower guide pin is inclined based on a center of a vertical axis of the tub.

The laundry processing apparatus may further include a guide stopper for prevent the upper transverse damper from being separated disposed at a bottom end of the upper guide pin.

The laundry processing apparatus of claim 6, further comprising a guide stopper for prevent the lower transverse damper from being separated disposed at a bottom end of the upper guide pin.

The above information disclosed in this background section is only for enhancement of understanding of the background of the invention and therefore it may contain information that does not form the prior art that is already known in this country to a person of ordinary skill in the art.

Advantageous Effects

The present invention has following one or more effects.

First, the laundry processing apparatus according to the present invention reduces the horizontal vibration of the tub through a transverse damper connecting the cabinet and the tub.

Second, the laundry processing apparatus according to the present invention efficiently reduces the horizontal vibration occurring from an upper side or a lower side of the tub through the upper transverse damper or the lower transverse damper.

Third, since at least one of the upper transverse damper or the lower transverse damper may move vertically, the laundry processing apparatus according to the present invention reduces the horizontal vibration while efficiently avoiding stress concentration due to the vertical vibration.

Fourth, since a guide pin is installed in at least one of an inner side or an outer side of the transverse damper and the transverse damper may move relative to the guide pin, the laundry processing apparatus according to the present invention efficiently minimizes the vibration occurring from the tube from being propagated to the cabinet.

Effects of the present invention may not be limited to the above and other objects and other objects which are not described may be clearly comprehended to those of skill in the art to which the embodiment pertains through the following description.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the. In some instances, known structures and devices are omitted, or are shown in block diagram form focusing on important features of the structures and devices, so as not to obscure the concept of the present invention.

Hereinafter, a top load washing machine is described as an example of a laundry processing apparatus, but the present invention is not limited to the washing machine.

Figure 1:
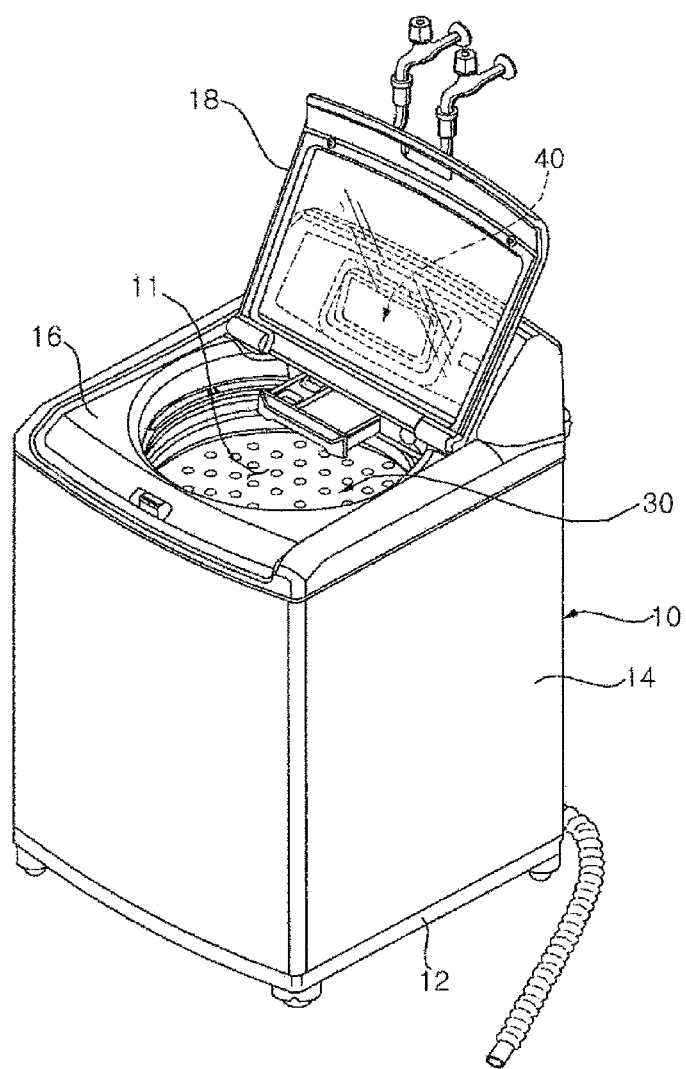
FIG. 1 is a perspective view illustrating a top load washing machine according to a first embodiment of the present invention.
Figure 2:
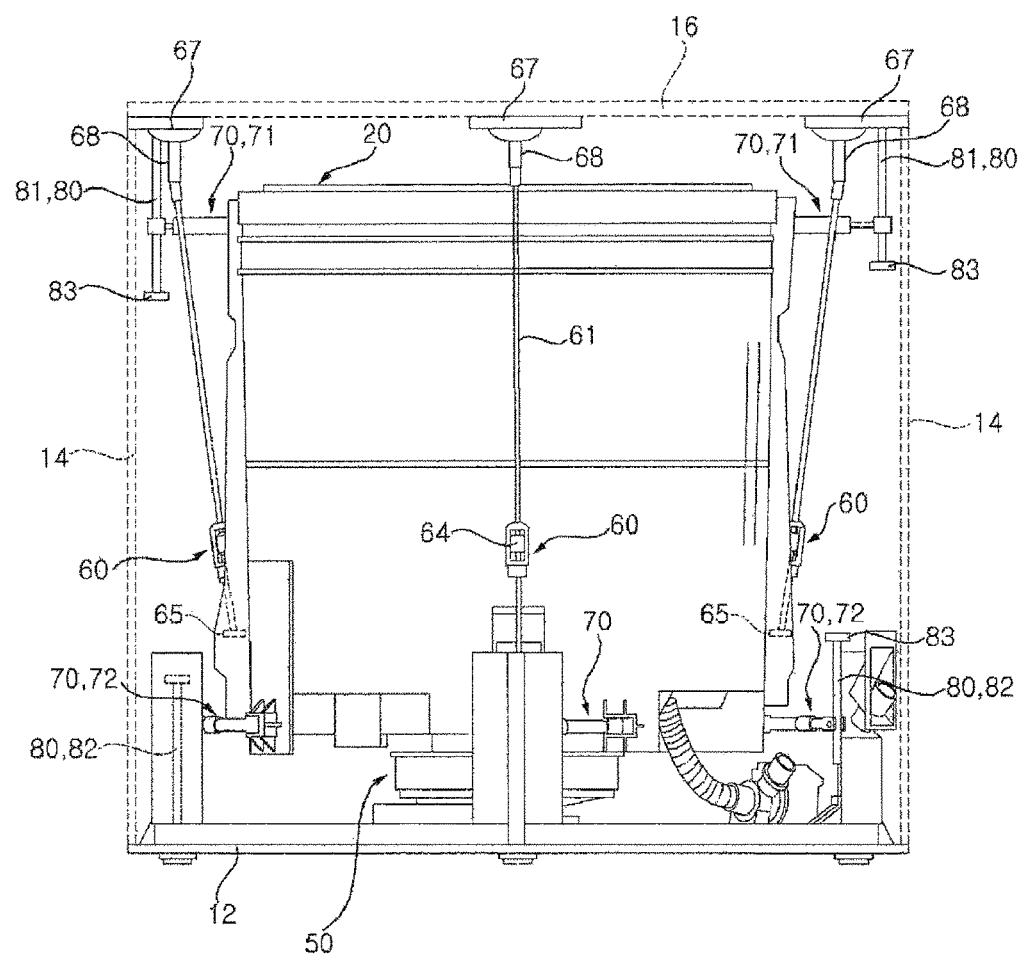
FIG. 2 is a front view illustrating an inside of a top load washing machine shown in FIG. 1.
Figure 3:
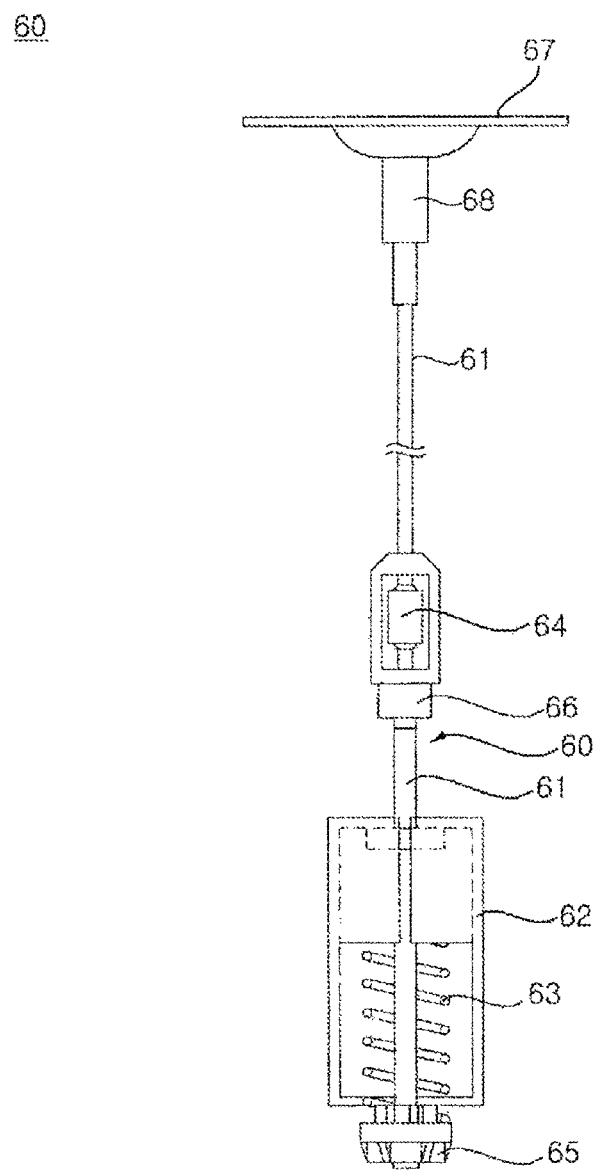
FIG. 3 is a front view illustrating a longitudinal damper shown in FIG. 2.
Figure 4:
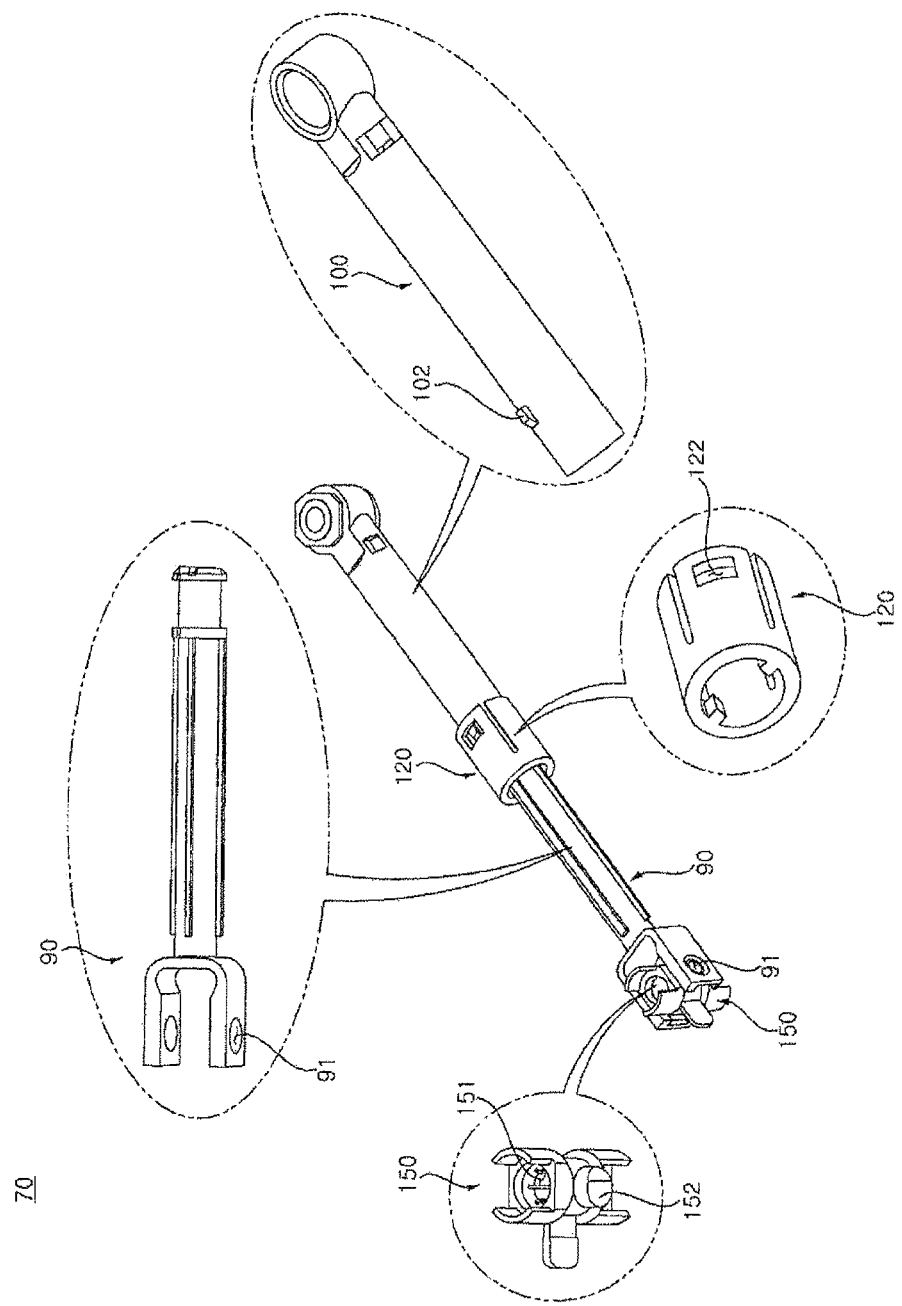
FIG. 4 is a perspective view illustrating a transverse damper shown in FIG. 2.

FIG. 1 is a perspective view illustrating a top load washing machine according to a first embodiment of the present invention, FIG. 2 is a front view illustrating an inside of a top load washing machine shown in FIG. 1, FIG. 3 is a front view illustrating a longitudinal damper shown in FIG. 2, and FIG. 4 is a perspective view illustrating a transverse damper shown in FIG. 2.

A washing machine according to the present embodiment includes a cabinet 10 configured to form an outer appearance; a tub 20 arranged in the interior of the cabinet, for storing laundry water; a drum 30 arranged inside the tub 20 in which the laundry water is loaded so that laundry is performed in the drum 30; a drive module 50 mounted in the tub to rotate the drum 30; longitudinal dampers 60 supporting the tub 20 as same hangs from the cabinet 10; and transverse dampers 70 coupled with the tub 20, for reducing the horizontal vibration for the tub 20.

The cabinet 10 includes a cabinet base 12 placed on the ground; a cabinet body 14 coupled with a peripheral region of the cabinet base 12 to form a lateral surface; a top cover 16 coupled with a upper part of the cabinet body 14 and including a upper part formed therein with an introduction hole 11; and a door 18 installed at the top cover 16 to open/close the introduction hole 11.

The door 18 is arranged therein with a transparent window so that an inside of the door 18 may be observed through the transparent window.

A control module 40 is installed at the top cover 16 so that a user may select a laundry mode and an operation state of the washing machine may be reported to the user.

The tub 20 is arranged in the interior of the cabinet 10.

The drum 30 is installed inside the cabinet 10.

Laundry water is stored in the tub 20 and the drum 30 is partially sunk by the stored laundry water.

A pulsator (not shown) is installed inside the drum 30.

The pulsator is located at a lower side inside the drum 30.

The drive module 50 is installed at a lower side outside of the tub 20.

The drive module 50 includes a drive shaft. The drive shaft is connected to the drum 30 and the pulsator through the tub 20.

At least one of the drum 30 or the pulsator may be driven by operating the drive shaft.

The drive module 50 may selectively drive at least one of the drum 30 or the pulsator, which is a general technology known to those skilled in the art.

The tub 20 is supported by the longitudinal dampers 60 as same hangs from the cabinet 10.

The longitudinal damper 60 is inclined to mainly reduce the vertical vibration during vibration occurring from the tub 20.

A top end of the longitudinal damper 60 is hung at the cabinet 10 and a bottom end of the longitudinal damper 60 is coupled with the tub 20.

The longitudinal damper 60 includes a support rod 61 configured to connect the tub 20 with the cabinet 10; a slider 62 installed at the support rod 61 and integrally moved with the tub 20 along the support rod 61; a damper spring 63 configured to elastically support the slider 62; a supporting end 65 installed at a bottom end of the support rod 61 to support the damper spring 63; and a friction part installed at the support rod 61, moved along the support rod 61, and moving together with the slider 62 during excessive vibration of the tub 2 to provide friction force to the slider 62.

A plurality of longitudinal dampers 60 are arranged around the tub 20.

A top end of the support rod 61 has a structure which is pivotally moved, and may be rotated during the vibration of the tub 20.

In the present embodiment, the top end of the support rod 61 is coupled with to the top cover 16 of the cabinet 10.

Unlike the present embodiment, the support rod 61 may be coupled with a certain part of the cabinet 10.

The supporting end 65 is located at a bottom end of the support rod 61. A damper spring 63 is supported at the supporting end 65. The supporting end 65 may be integrally formed with the tub 20.

When the vibration occurs in the tub 20, the supporting end 65 is moved together with the tub 20. The slider 62 is moved along the support rod 61, and a bottom end of the slider 62 is supported by the tub 20.

The damper spring 63 is arranged between the supporting end 65 and the slider 62 and provides elastic force to the slider 62.

A friction part housing 66 is installed at the support rod 61 and the friction part 64 is installed inside the friction part housing 66.

When the vibration of the tub 20 is in a normal vibration state of a predetermined level or less, friction due to the friction part 64 is not generated. When the vibration of the tub 20 is in an excessive vibration state greater than the predetermined level, the friction due to the friction part 64 is generated.

In a case of the normal vibration state, a buffer operation due to the damper spring 63 and attenuation due to the slider 62 are achieved.

In a case of the excessive vibration state, a combination attenuation of a buffer operation of the damper spring 63, attenuation of the slider 62, and friction force of the friction part 64 is applied.

That is, in an excessive vibration state exceeding a buffer range of the damper spring 63, the slider 62 pushes and moves the friction part housing 66 to operate the friction part 64.

Meanwhile, in order to assemble the support rod 61 with the top cover 16, a pivot 68 and a pivot supporting part 67 are installed in the top cover 16.

The support rod 61 is installed to perform a rotation motion by the vibration of the tub 20. In order to easily implement the rotation motion of the support rod 61, the pivot 68 and the pivot supporting part 67 are installed.

A top end of the support rod 61 is formed through the pivot supporting part 67. The top end of the support rod 61 is hung at the pivot supporting part 67.

The pivot 68 is inserted from an upper part through an opening portion formed in a substantially central portion. The pivot 68 does not fully pass through the pivot supporting part 67 but is partially hung at the pivot supporting part 67.

In the present embodiment, an upper transverse damper 70 to be described below is coupled with the pivot supporting part 67, and a load of the upper transverse damper 71 is transferred to the pivot supporting part 67.

The transverse damper 70 buffers the horizontal vibration during the vibration occurring from the tub 20.

In the present embodiment, the transverse damper 70 connects the cabinet 10 and the tub 20.

The transverse dampers 70 are disposed at an upper part and a lower part of the tub 20, respectively.

Further, a plurality of the transverse dampers 70 is circumferentially disposed.

For convenience of the description, a reference numeral of an upper transverse damper is defined as 71 and a reference numeral of a lower transverse damper is defined as 72.

In the present embodiment, four upper transverse dampers 71 of the transverse dampers 70 are disposed at an upper part of the tub 20 at the same interval. Moreover, four lower transverse dampers 72 of the transverse dampers 70 are disposed at a lower part of the tub 20 at the same interval.

In order to assemble the transverse dampers, guide pins 80 are disposed at an upper part and a lower part of the cabinet 10, respectively.

The transverse dampers 70 are vertically moved along the guide pin 80 to buffer the transverse vibration.

In the present embodiment, although one guide pin 80 may be configured, an upper guide pin 81 coupled with the upper transverse damper 71 and a lower guide pin 82 coupled with the lower transverse damper 72 are installed, respectively.

The guide pin 80 may vertically extend long. An upper guide pin 81 may extend long downward. A lower guide pin 82 may extend long upward.

In the present embodiment, the upper guide pin 81 is installed at a pivot supporting part 67 and protrudes to a lower side of the pivot supporting part 67. In the present embodiment, the lower guide pin 82 is installed at a cabinet base 12 and protrudes to an upper side of the cabinet base 12.

Unlike the present embodiment, the upper guide pin 81 and the pivot supporting part 67 may be integrally manufactured. Unlike the present embodiment, the lower guide pin 82 and the cabinet base 12 may be integrally manufactured.

A guide stopper 83 for preventing the transverse damper 70 from being separated is disposed at a bottom end of the upper guide pin 81 and a top end of the lower guide pin 82. Unlike the present embodiment, a friction part 64 may be disposed at the upper guide pin 81 and the lower guide pin 82 to suppress separation of the transverse damper 70.

Although only the guide pin 80 is shown for description in the present embodiment, a separate support structure (not shown) may be installed in order to support vibration of the tub 20.

In the present embodiment, the guide pin 80 is coupled with the top cover 16 or the cabinet base 12 to be supported, and is not directly connected with the cabinet body 14. Unlike the present embodiment, when the cabinet body 14 is a firm structure, the guide pin 80 may be coupled with the cabinet body 14.

The transverse damper 70 includes a first connection member 90 coupled with one of the cabinet 10 or the tub 20; a second connection member 100 inserted into the interior of the first connection member 90 to relatively move, and coupled with the other of the cabinet 10 or the tub 20; and a damper holder 150 coupled with an end of the first connection member 90 and an end of the second connection member 100 and rotated relative to the first connection member 90 or the second connection member 100.

In the present embodiment, the first connection member 90 is configured in the form of a piston, and the second connection member 100 is configured in the form of a cylinder.

A fluid is filled in the second connection member 100 used as the cylinder and provides a damping force during relative motion with the first connection member 90.

The damper holder 150 may be installed in one or both of an end of the first connection member 90 or an end of the second connection member 100.

In the present embodiment, the damper holder 150 is installed at the first connection member 90 coupled with the guide pin 80.

The damper holder 150 is formed therein with a guide hole 151 in which the guide pin 80 is inserted and a holder shaft 152 coupled with the first connection member 90 to be rotated.

The damper holder 150 may be vertically moved along the guide pin 80.

In this case, the damper holder 150 is rotated based on the holder shaft 152 to compensate an angle formed due to relative motion of the transverse damper 70.

The first connection member 90 is formed therein with a holder shaft hole 91 in which the holder shaft 152 is inserted.

The damper holder 150 connects the guide pin 80 and the first connection member 90 to cross each other.

Further, a piston stopper 120 for limiting a moving distance of the first connection member 90 may be installed at the second connection member 100. The piston stopper 120 is hung at the coupling protrusion 102 which is formed at the second connection member 100.

The piston stopper 120 is coupled with a side of the second connection member 100 in which the first connection member 90 is inserted.

The piston stopper 120 is formed therein with a coupling hole 122 in which the coupling protrusion 102 is inserted.

Figure 5:
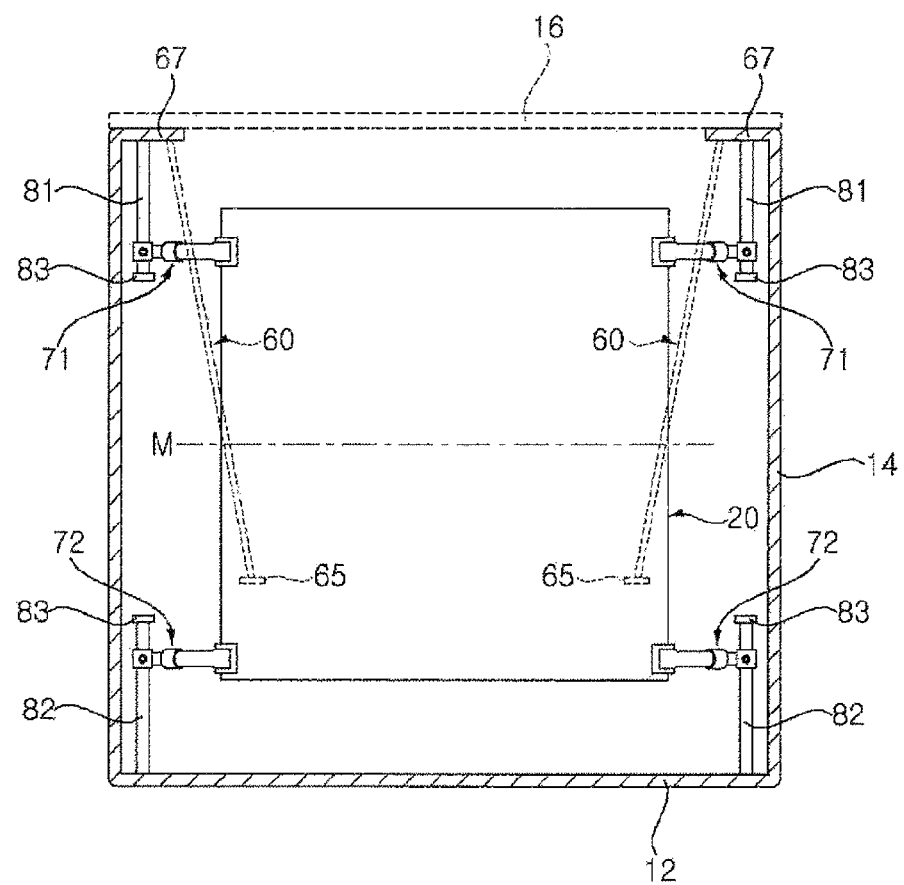
FIG. 5 is a front view schematically illustrating arrangement of a transverse damper in a top load washing machine according to a first embodiment of the present invention.
Figure 6:
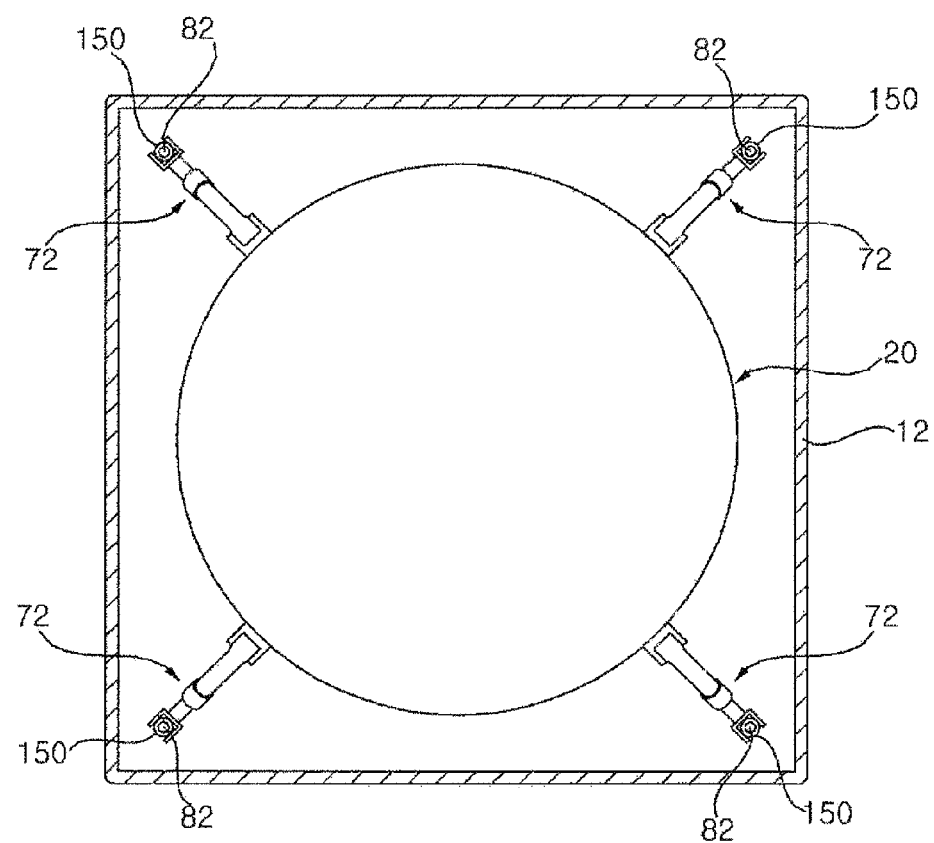
FIG. 6 is a plan view schematically illustrating arrangement of a transverse damper in a top load washing machine according to a first embodiment of the present invention.

FIG. 5 is a front view schematically illustrating arrangement of a transverse damper in a top load washing machine according to a first embodiment of the present invention, and FIG. 6 is a plan view schematically illustrating arrangement of a transverse damper in a top load washing machine according to a first embodiment of the present invention.

In the present embodiment, the transverse dampers 70 are installed at an upper part and a lower part based on the supporting end 65.

When viewed from the top, an inner side of the transverse damper 70 is coupled with the tub and an outer side thereof is coupled with the guide pin 80.

The guide pin 80 vertically extends long.

The transverse damper 70 is coupled with the guide pin 80 to cross each other.

A damper holder 150 is disposed between the transverse damper 70 and the guide pin 80.

When vibration occurs in the tub 20, the transverse damper 70 may be vertically moved along the guide pin 80. More accurately, the first connection member 90 coupled with the damper holder 150 may be vertically moved along the guide pin 80 together with the damper holder 150.

Moreover, when vibration occurs in the tub 20, the first connection member 90 and the second connection member 100 move relative to each other to damp the transverse vibration of t the tub 20. (hereinafter, to damp vibration by the transverse damper is defined as a transverse damping)

The transverse damping may be operated in a state that the transverse damper 70 is fixed to the guide pin 80. The transverse damping may be operated when the transverse damper 70 is moved along the guide pin 80.

When a height of the transverse damper 70 is changed, the damper holder 150 is rotated based on the holder shaft 152 to prevent the guide pin 80 or the transverse damper 70 from being deformed.

In addition, an upper transverse damper 71 may be located above a middle height M of the tub 20, and a lower transverse damper 72 may be located under the middle height M of the tub 20.

When viewed from the top, four upper transverse dampers 71 are disposed around the tub 20 and are disposed at the same interval based on an axis of the tub 20.

Further, four lower transverse dampers 72 are disposed around the tub 20 and are disposed at the same interval based on an axis of the tub 20.

Moreover, in the present embodiment, when viewed from the top, an outer side of the transverse damper 70 is located at an edge of the cabinet 10 and an inner side of the transverse damper 70 is located at a peripheral surface of the tub 20.

Thus, when viewed from the top, a pair of two transverse dampers 70 is located at a straight line.

That is, four upper transverse dampers 71 are disposed toward a drive shaft of the tub 20.

In the present embodiment, the transverse damper 70 is radially disposed at a peripheral surface of the tub 20. The transverse damper 70 is installed perpendicular to a peripheral surface of the tub 20.

Unlike the present embodiment, the transverse damper 70 is not perpendicular to an outer peripheral surface of the tub 20, and may cross the outer peripheral surface of the tub 20 with an acute angle or an obtuse angle.

In the present embodiment, the shaft center corresponds to the drive shaft.

When viewed from the front, the upper transverse damper 71 and the lower transverse damper 72 are disposed horizontal to the ground.

Figure 7:
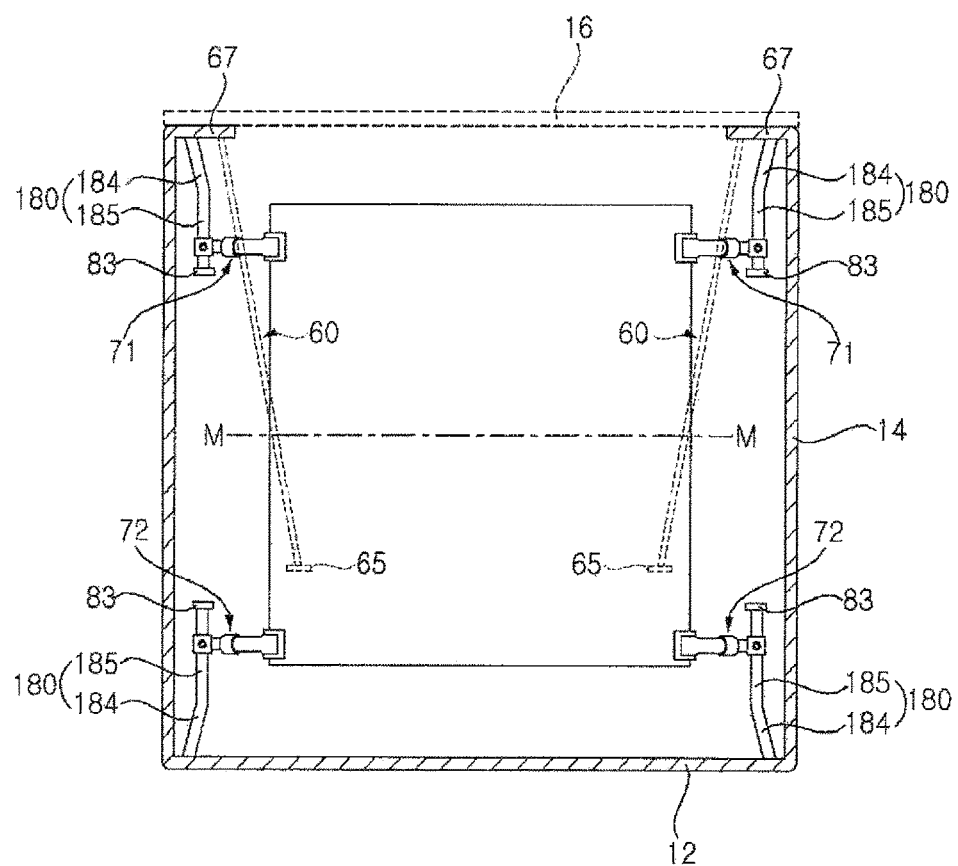
FIG. 7 is a front view schematically illustrating arrangement of a transverse damper in a top load washing machine according to a second embodiment of the present invention.

FIG. 7 is a front view schematically illustrating arrangement of a transverse damper in a top load washing machine according to a second embodiment of the present invention.

In the present embodiment, at least a part of the guide pin 180 may be inclined at a vertical direction.

A guide pin 180 according to the present embodiment includes an oblique support part 184 coupled with the pivot supporting part 67 and a guide part 185 coupled with the transverse damper 70 and vertically guiding the transverse damper 70.

The oblique support part 184 may be fixed to the top cover 16.

In particular, the oblique support part 184 may be fixed to the pivot supporting part 67.

The oblique support part 184 may be inclined toward a vertical direction.

The oblique support part 184 is bent inward from an outer side of the tub 20.

When the horizontal vibration occurs in the tub 20, the oblique support part 184 may efficiently support the tub 20.

The oblique support part 184 may reduce a distance of the guide part 185 and a distance of the tub 20. Thus, a distance of the upper transverse damper 71 or the lower transverse damper 72 connecting the guide part 185 and the tub 20 may be reduced and miniaturized.

Hereinafter, remaining constituent elements are the same as those of the first embodiment, and the detailed description thereof will be omitted.

Figure 8:
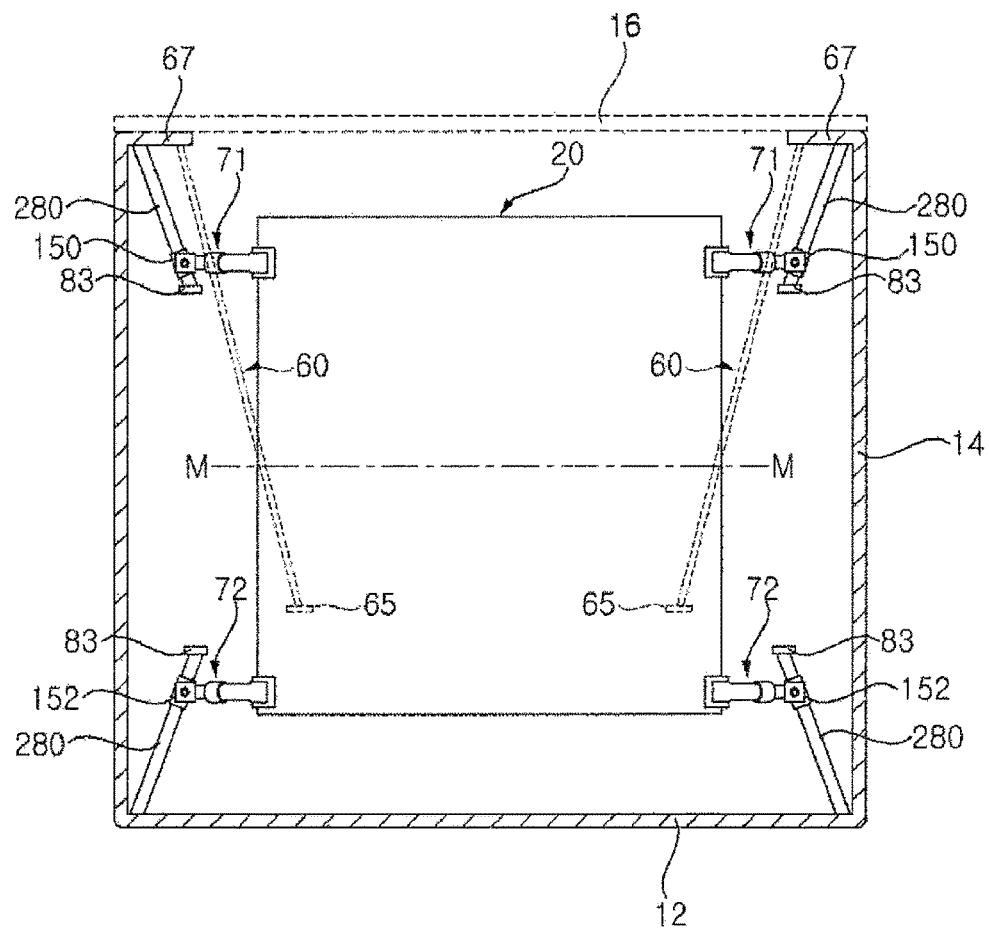
FIG. 8 is a front view schematically illustrating arrangement of a transverse damper in a top load washing machine according to a third embodiment of the present invention.

FIG. 8 is a front view schematically illustrating arrangement of a transverse damper in a top load washing machine according to a third embodiment of the present invention.

A guide pin 280 according to the present embodiment is disposed an oblique direction or a diagonal direction, and the transverse damper 70 may be moved in the oblique direction or the diagonal direction along the guide pin 280.

The oblique direction or the diagonal direction means a direction inclined at a vertical direction.

In the present embodiment, an oblique direction or a diagonal direction of an upper guide pin means a direction from an upper side to a lower side and a direction from an outer side to an inner side. An oblique direction or a diagonal direction of a lower guide pin means a direction from a lower side to an upper side and a direction from an outer side to an inner side.

A damper holder 150 installed at the transverse damper 70 is disposed so that the holder shaft 152 is inclined. Thus, when the vibration occurs in the tub 20, the damper holder 150 may be moved in an oblique direction or a diagonal direction along the inclined guide pin 280.

Unlike the present embodiment, only one of the upper transverse damper 71 or the lower transverse damper 72 may be coupled with the obliquely disposed guide pin 280.

Hereinafter, remaining constituent elements are the same as those of the first embodiment, and the detailed description thereof will be omitted.

The invention claimed is:

1. A laundry processing apparatus comprising:
    a cabinet;
    a tub, arranged in the interior of the cabinet, for storing laundry water;
    a plurality of longitudinal dampers coupled to and supporting the tub within the cabinet;
    a plurality of pivot supporting parts, arranged on the top of the cabinet, from each of which one of the plurality of longitudinal dampers are hung and supported;
    a plurality of upper guide pins each of which are fixed to one of the plurality of pivot supporting parts at an upper end thereof and each having a free end disposed at a bottom end thereof and extending vertically; and
    a plurality of upper transverse dampers, each of which are connecting the plurality of upper guide pins and the tub, wherein at least one of the plurality of upper transverse damper comprises:
        a first connection member with a first end coupled to the tub; and
        a second connection member with a second end which is coupled to the upper guide pin and movable along the upper guide pin,
        wherein a distance between the first end and second end is varied according to a horizontal vibration of the tub and a damping force is generated according to a variation of the distance.

2. The laundry processing apparatus of claim 1, wherein the cabinet further comprises:
    a top cover disposed at an upper part of the tub, and
    the plurality of pivot supporting parts are fixed to the top cover.

3. The laundry processing apparatus of claim 1, wherein the plurality of upper transverse dampers are disposed at equal intervals about a center of a vertical axis of the tub.

4. The laundry processing apparatus of claim 1, wherein at least a part of each upper guide pin is inclined in a vertical direction.

5. The laundry processing apparatus of claim 1, wherein each upper guide pin comprises:
    an oblique support part fixed to the pivot supporting part and inclined in a vertical direction; and
    a guide part coupled with the upper transverse damper to vertically guide the upper transverse damper.

6. The laundry processing apparatus of claim 1, further comprising:
    a lower guide pin fixed to a lower part of the cabinet and vertically extending upwards; and
    a lower transverse damper, connecting the lower guide pin and the tub, and vertically moving along the lower guide pin for reducing the horizontal vibration of the tub.

7. The laundry processing apparatus of claim 6, wherein a plurality of lower transverse dampers are disposed at equal intervals about a center of a vertical axis of the tub.

8. The laundry processing apparatus of claim 6, wherein an outer side of at least one of the upper transverse dampers or the lower transverse damper is located at an edge of the cabinet.

9. The laundry processing apparatus of claim 6, wherein at least one of the upper guide pins or the lower guide pin is inclined based on a center of a vertical axis of the tub.

10. The laundry processing apparatus of claim 6, wherein each upper guide pin comprises:
    an oblique support part fixed to the pivot support part and inclined based on a center of a vertical axis of the tub; and
    a guide part coupled with the upper transvers damper to vertically guide the upper transverse damper.

11. The laundry processing apparatus of claim 6, wherein the cabinet comprises:
    a cabinet base placed on a ground;
    a cabinet body coupled with an edge of the cabinet base to form a lateral surface; and
    a top cover coupled with an upper part of the cabinet body and including an upper part formed therein with an introduction hole so that laundry is vertically introduced,
    wherein each upper guide pin is installed at the top cover, and the lower guide pin is installed at the cabinet base.

12. The laundry processing apparatus of claim 11, wherein at least one of the upper guide pins or the lower guide pin is inclined based on a center of a vertical axis of the tub.

13. The laundry processing apparatus of claim 11, wherein at least a part of each upper guide pin is inclined based on a center of a vertical axis of the tub, and
    at least a part of the lower guide pin is inclined based on a center of a vertical axis of the tub.

14. The laundry processing apparatus of claim 6, further comprising:
    a guide stopper for preventing the upper transverse damper from being separated from a bottom end of the upper guide pin.

15. The laundry processing apparatus of claim 6, further comprising:
    a guide stopper for preventing the lower transverse damper from being separated from an upper end of the lower guide pin.

* * * * *